Feb. 12, 1957  R. G. RUDNIK ET AL  2,781,272
METHOD OF FORMING A STACK OF INTERLEAVED
CHEESE SLICES AND APPARATUS THEREFOR
Filed July 29, 1954  7 Sheets-Sheet 1

Fig. 1.

Inventors
Raymond G. Rudnik
Roland E. Miller
Henry Borgardt
By Evans, Haister & Anderson
Attorneys

United States Patent Office 2,781,272
Patented Feb. 12, 1957

2,781,272
METHOD OF FORMING A STACK OF INTERLEAVED CHEESE SLICES AND APPARATUS THEREFOR

Raymond G. Rudnik, Homewood, Roland E. Miller, Orangeville, and Henry Borgardt, Chicago, Ill., assignors to Kraft Foods Company, Chicago, Ill., a corporation of Delaware Application July 29, 1954, Serial No. 446,586

14 Claims. (Cl. 99—178)

This invention relates to a method and apparatus for interleaving slices of cheese and paper or similar separator sheets and for collecting stacks of such interleaved material.

Machines have heretofore been available for slicing cheese and delivering the slices to a conveyor or other receiving means from which the slices are manually removed and interleaved with separator sheets preparatory to packaging or wrapping of stacks of the interleaved cheese slices and separator sheets. The present invention relates to mechanism which is adapted to receive cheese slices from known slicing mechanism and to automatically apply separator sheets to the cheese slices and to assemble such slices and separator sheets in stacks containing predetermined numbers of cheese slices, each slice in each stack being separated from the adjacent slices by a separator sheet.

The main objects of the invention are to provide an improved method and apparatus for automatically interleaving cheese slices and separator sheets and for forming interleaved stacks containing predetermined numbers of cheese slices; to provide such a method and apparatus whereby cheese slices will appear on both faces of the collected stack so that when the stacks are wrapped in a transparent wrapper, the color and general character of the cheese will be visible on both faces of the package; and other objects and advantages of the invention will be understood by reference to the following specification and accompanying drawings (7 sheets) in which there is illustrated a method and apparatus of the character indicated and embodying a selected form of the invention.

Figure 2:
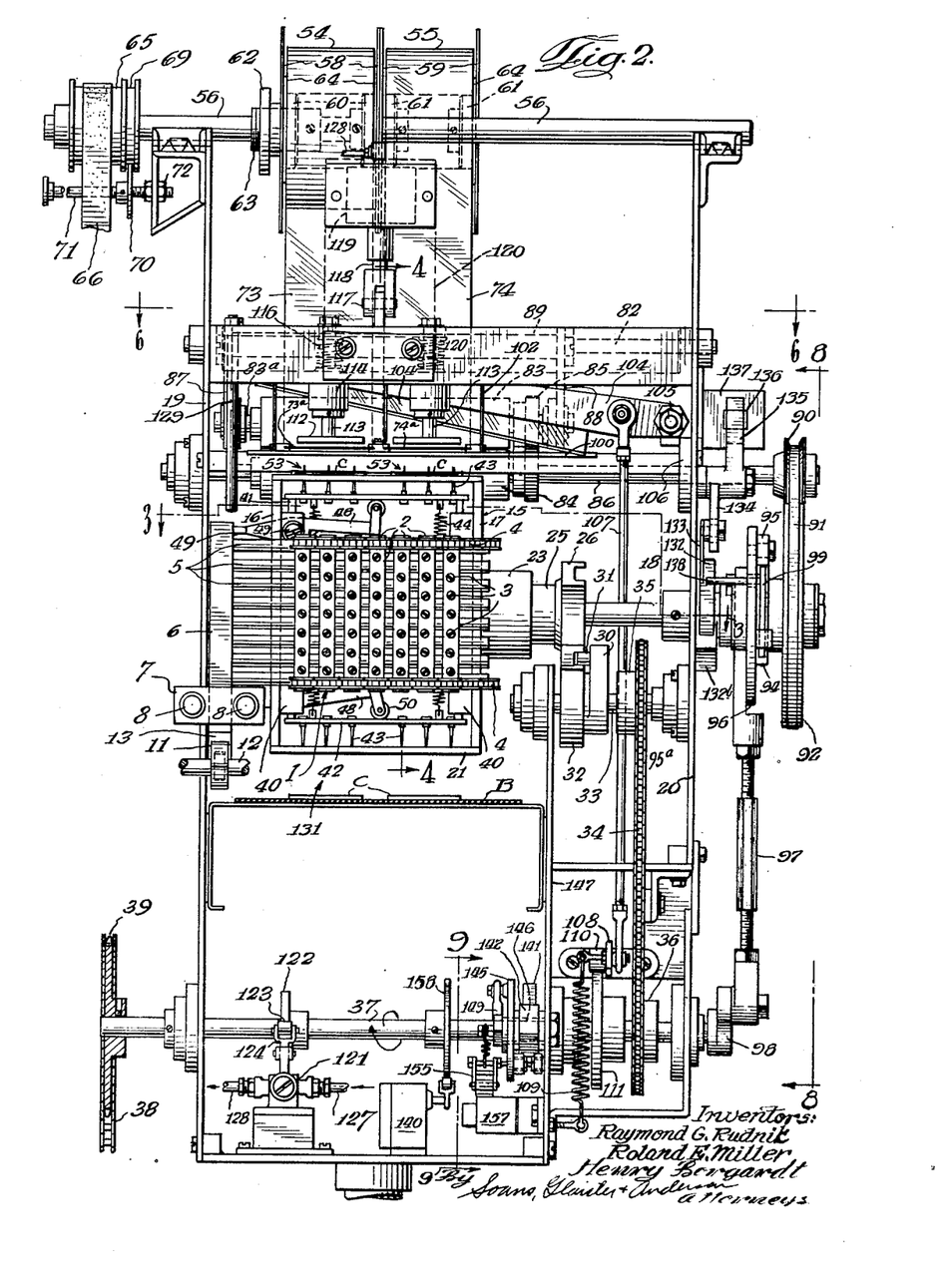
Fig. 2 is a side elevation of the right hand side of Fig. 1.
Figure 3:
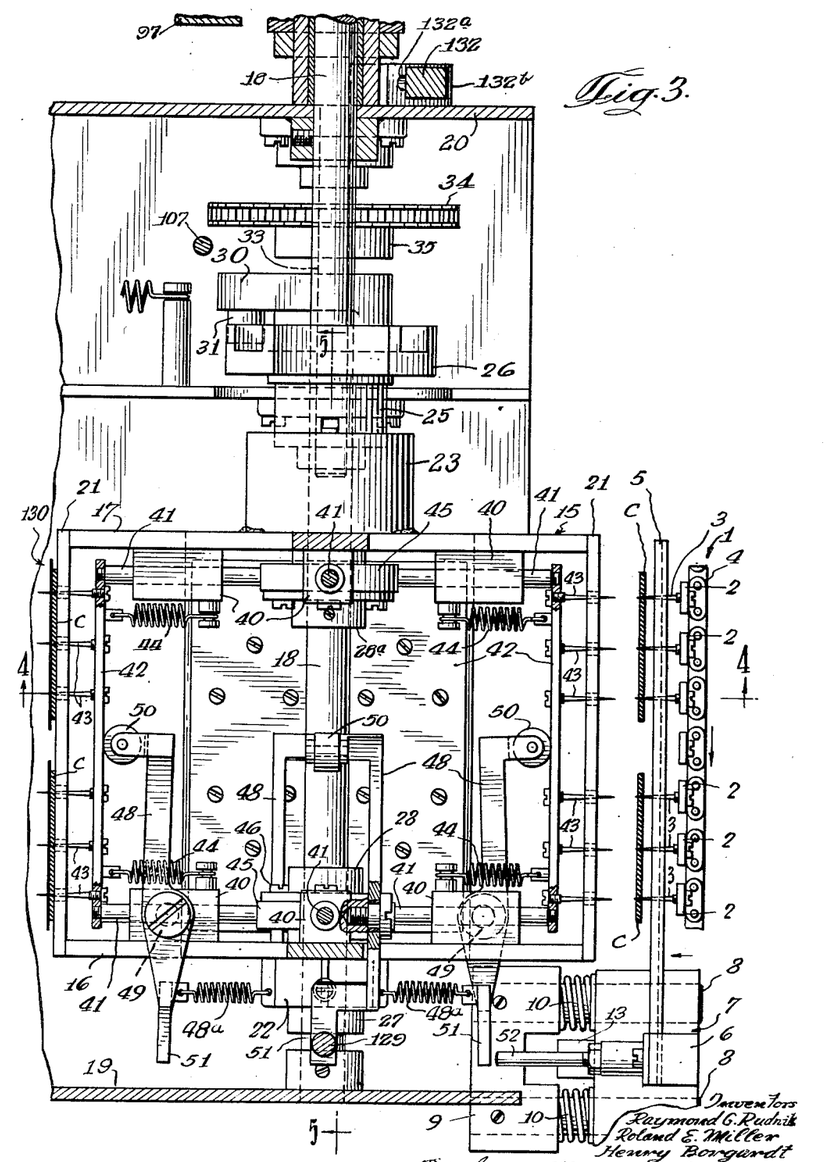
Fig. 3 is a plan section on the lines 3—3 of Figs. 1 and 2.

A commercially available cheese slicing machine operates to deliver cheese slices to a conveyor 1 which comprises a series of parallel vertically disposed bars 2 (see Figs. 2 and 3), each of which is provided with a series of horizontally projecting sharp elongated pins 3 on which cheese slices such as indicated at C are impaled as shown in Fig. 3. These conveyor bars 2 are carried by suitable conveyor chains 4 (see Figs. 3 and 4) which travel around suitably mounted sprockets so that the cheese slices are conveyed along a predetermined path of travel. The conveyor is actuated intermittently and in one arrangement, apparatus is used to simultaneously strip two slices of cheese from successive sets of cheese slice carrying pins 3. Such stripping mechanism is represented in the drawings by a series of transversely arcuate, horizontally extending bars 5, these bars being mounted on a header 6 which is rigid with and projects upwardly from a cross head member 7 (Fig. 2). Said member 7 is suitably drilled and horizontally slidably mounted on a pair of short rods 8 which are fixedly supported in a member 9 (Figs. 1 and 3) which is a part of the aforesaid commercial slicing machine, but which may also be suitably secured to adjacent frame portions of the interleaving apparatus. Coil springs such as indicated at 10 are disposed around the respective rods 8 and normally urge the member 7 and the other elements of the stripping mechanism away from the support 9 so that the stripper bars 5 are normally retracted from the free ends of the cheese carrying pins 3. A cam 11 carried by a driven shaft 12 which is also a part of the slicing machine, acts against a roller carried by an arm 13 which is rigid with and depends from the cross head 7 so that the cam is operative to urge the cross head 7 and the stripper bars 5 to move against the pressure of the springs 10, to thereby move the stripper bars 5 toward the pointed ends of the pins 3 for stripping the cheese slices from said pins.

Figure 1:
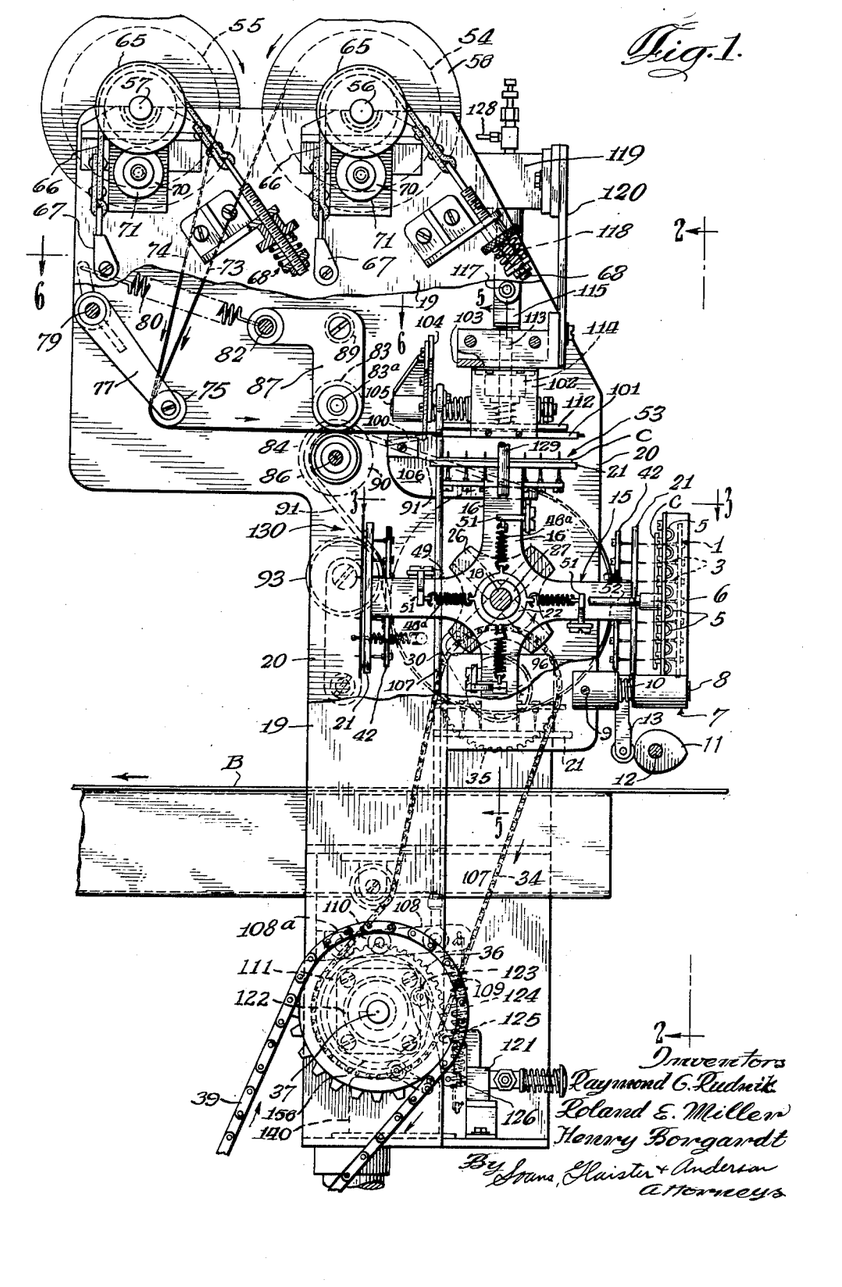
Fig. 1 is a front elevation.
Figure 4:
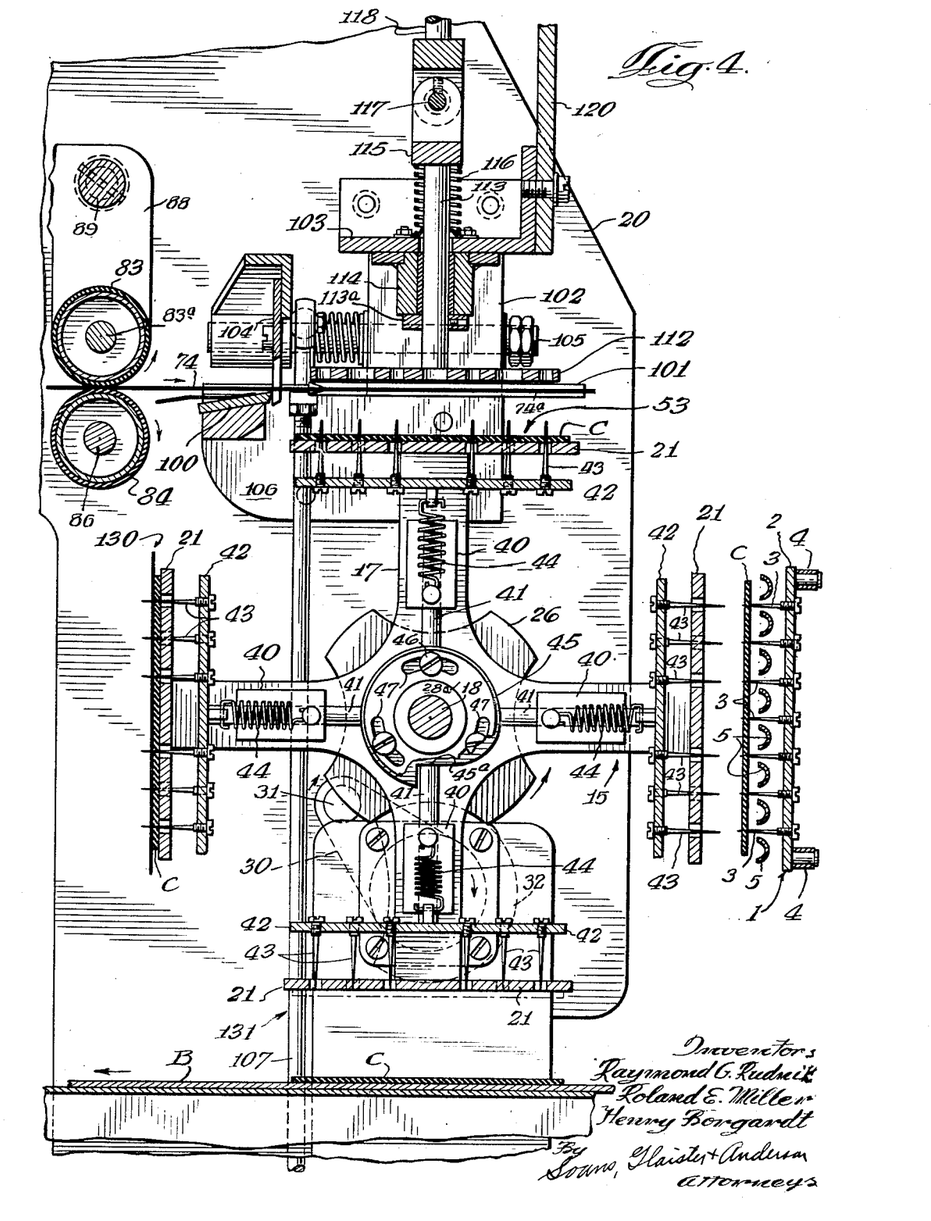
Fig. 4 is a section on the lines 4—4 of Figs. 2 and 3.
Figure 5:
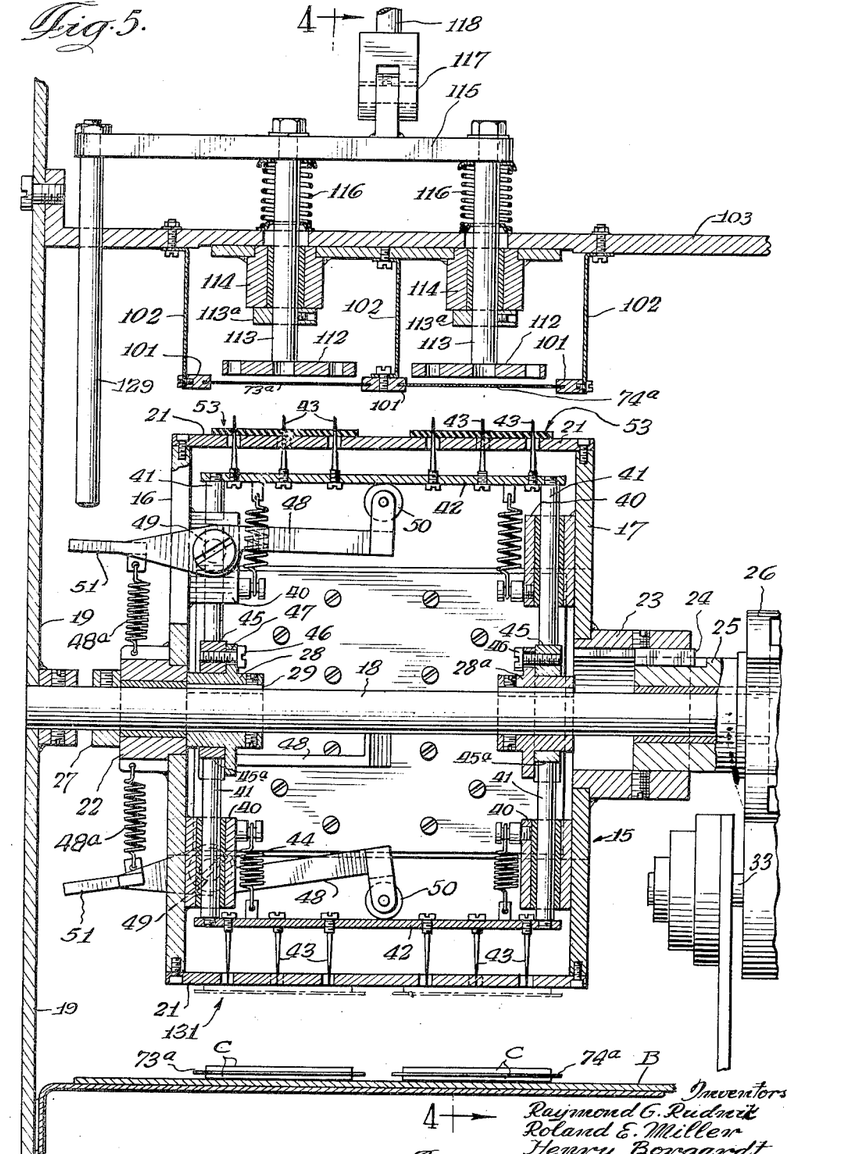
Fig. 5 is a section on the lines 5—5 of Figs. 1 and 3.

The interleaving mechanism comprises a turret structure 15 having a pair of end plates 16 and 17, each being a four armed spider as best shown in Figs. 1 and 4. These end members 16 and 17 are rotatably supported on a shaft 18 which is fixedly mounted at its ends in suitable bearings provided on front and rear frame plates 19 and 20 of the interleaving apparatus. These frame plates are supported by suitable frame work and by interconnecting cross elements, the details of which are not important but some of which will hereinafter be referred to. As best shown in Figs. 3 and 5, the ends of the arms of the spider members 16 and 17 are rigidly interconnected by plates 21 which are screwed or otherwise suitably secured to the ends of the spider arms.

The spider plate 16 is welded or otherwise secured to a hub 22 (Fig. 5) which is rotatably mounted on the shaft 18, a suitable bearing sleeve being provided in the hub as shown in Fig. 5. The spider plate 17 is secured to a hub 23 which fits over and is keyed as is indicated at 24 to the hub 25 of the driven member 26 of a Geneva drive mechanism, whereby the turret structure is intermittently actuated and rotated through successive arcs of 90°. The driven member 26 is roatably mounted on the fixed shaft 18 through the agency of a suitable bearing sleeve as is also shown in Fig. 5. The position of the turret axially of the shaft 18 is determined by a collar 27 and sleeve 28 on opposite sides of the hub 22, said collar and sleeve being locked in fixed position on the shaft by set screws as shown.

The driven member 26 of the Geneva drive mechanism is actuated by a rotating arm 30 and pin 31 (see Figs. 1 and 2), said arm 30 being fixedly secured to a disc part 32 which cooperates with the driven member 26 to lock the latter in its successive positions, and said arm 30 and disc 32 are fixedly mounted on a shaft 33 which is continuously driven. Said shaft is driven by means of a chain 34 which engages a sprocket 35 on said shaft 33 and a sprocket 36 on a main driving shaft 37 which is suitably journalled in the frame structure of the apparatus. This shaft 37 is in turn continuously driven by means of a chain 38 which engages a sprocket 39 on the shaft 37 and a driving sprocket carried by a driven shaft (not shown) of the slicing machine. By drivingly interconnecting the interleaving apparatus with the slicing machine in this manner, synchronization of the delivery of cheese slices to the interleaving mechanism and operation of the latter is facilitated. However, if preferred, an independent drive may be applied to the shaft 37, suitable timing mechanism being then provided to facilitate the required synchronized operation of the interleaving apparatus with the operation of the cheese slicing and delivering apparatus.

The arms of the end plates 16 and 17 of the rotary turret structure are each provided with suitable bearing blocks 40 (Figs. 3 and 5) which slidably receive rods 41. The slidably mounted rods 41 of opposed spider arms are interconnected by header or pin plates 42. Each of these header plates 42 are equipped with elongated sharp pointed impaling pins 43 arranged so that when disposed adjacent the cheese slice delivery portion of the conveyor 1, the pins 43 will be in opposed relationship to the conveyor pins 3. By inspection of Figs. 3 and 4, it will be readily understood that each cheese slice is engaged, in this instance, by three rows of pins 3 on the conveyor 1 from which said slices are delivered to oppositely disposed pins 43 on the turret. As shown, the turret plates 21 are apertured to permit free passage of the pins 43 therethrough and it will be evident that said plates 21 are adapted to serve as stripper plates for removing the cheese slices from said pins 43.

The pin carrying plates 42 of the turret structure are normally retracted, that is to say, drawn toward the axis of the turret by pairs of coil springs 44 which are tensioned between the pin carrying plates 42 and anchor pins projecting from said bearing blocks 40. The retracted position of the pin carrying plates is determined by normally stationary cam members 45 (see Figs. 3 and 4) having their peripheries suitably shaped to control the inward movement of the pin carrying plates under the force applied by said springs 44. As shown in Figs. 3 and 4, the inner ends of the sliding rods 41 which carry the pin plates, are adapted to ride on the peripheries of said cams 45. One of the cams 45 is mounted on the flanged sleeve 28 (Fig. 5) through the agency of machine screws 46 which are threaded into the cams and passed through slots 47 in the flange of said sleeve 28; the slots 47 are concentric with the axis of the sleeve so that the cam 45 is rotatably adjustable about the axis of the sleeve 28 and shaft 18. The other cam 45 which is adjacent the turret end plate 17 is similarly adjustably mounted on another flanged sleeve 28a. By means of this rotary adjustment of the cams 45, timing of the positioning effects thereof may be easily adjusted.

Assuming that a pair of cheese slices C are presented by the conveyor in position for delivery to the interleaving apparatus, the turret 15 will come to rest with a set of its impaling pins 43 directly opposite to the conveyor pins 3 which support the cheese slices as shown in Fig. 3. The cam 11 then effects shifting of the stripper arm 5 to strip the cheese slices from the conveyor pins 3 and to transfer the same to oppositely disposed turret carried pins 43 which are simultaneously advanced or projected toward the conveyor pins 3 so that the cheese slices will become impaled on the pins 43 before they are completely stripped from the conveyor pins 3.

For advancing or extending the projection of the set of turret pins 43 in cheese slice receiving position, there is associated with each pin carrying plate 42 a rock arm 48 (Figs. 3 and 5) which is pivotally mounted intermediate its ends as indicated at 49 on one side of one of the bearing blocks 40. Said rock arm 48 is provided with a roller 50 at one end for bearing against the inner face of the pin plate 42 and its other arm extends outwardly from the turret end member 16 and presents a portion 51 opposite to a pin 52 which is rigid with the header 6 of the stripping mechanism (see also Fig. 1). When the stripping mechanism is actuated toward the left in Figs. 1 and 3, the free end of the pin 52 will engage the lever arm portion 51 and cause the same to rock about its pivot 49, thereby causing the roller 50 to press against and move the pin plate 42 outwardly. By this means, the set of turret carried pins 43 which is to receive the cheese slices from the conveyor 1 are moved into proximity to the conveyor pins 3 so that the cheese slices cannot drop between the pins 3 and 43 but will be impaled on the turret pins 43 before the slices are completely free from the conveyor pins 3. Light springs 48a bias the rollers 50 toward the pin plates 42.

When a pair of cheese slices have been delivered to a set of the turret pins 43, the turret is advanced one step of rotation, i. e., 90°. As shown in the drawings, the cheese slices are delivered in vertical planes, i. e., on edge, so that when the turret is rotated through a 90° step of rotation, the cheese slices delivered to the turret, as just explained, will be presented on the top of the turret in the position indicated at 53 in Figs. 1, 2, 4 and 5.

Paper separator sheets are next deposited on the top surface of the cheese slices in the position 53 except when the slices are destined to be the first or bottom slices of a stack. The means for applying separator sheets on the cheese slices in said position 53 will now be explained and means for periodically interrupting or preventing the delivery of paper to such first or bottom slices will hereinafter be explained.

A pair of rolls 54 and 55 (Figs. 1 and 2) of suitable separator paper are independently supported on shafts 56 and 57 respectively, these shafts being suitably rotatably supported in open bearings provided on the upper ends of the side plates 19 and 20 of the frame structure. The paper rolls 54 and 55 are each supported between pairs of discs or flanges 58 and 59 respectively, and on suitable center collar pairs 60 and 61 respectively, said collar pairs being secured to the respective shafts 56 and 57. The paper rolls fit on the collars or hubs 60 and 61 and are frictionally clamped between the disc pairs 58 and 59 so that withdrawal of the paper webs from the rolls will neceessitate turning of the spool structures and of the shafts 56 and 57 in their respective bearings. One of the hubs of each pair 60 and 61 is axially adjustably mounted on the supporting shaft so as to be adjustable toward its cooperating hub to clamp the paper rolls between central portions of the flange pairs 58 and 59. To that end, there are provided central disc portions 64 for engaging only the central portions of the respective paper rolls so that the paper webs remain freely withdrawable from between the outer portions of the respective rolls.

To control the withdrawal of the paper strips from the respective rolls and to prevent free rotation of said rolls and excessive unwinding of said paper strips, each shaft 56 and 57 is proivded with a brake arrangement comprising a pulley 65 attached to an end portion of the shaft, a flexible brake belt 66 which is fixedly anchored at one end as indicated at 67 to the adjacent frame plate of the machine and connected at its other end to a spring tensioning device 68 which is adjustable to vary the braking effect of the belt on the pulley 65.

Each pulley 65 is provided with a circumferential groove 69 which receives a circular flange 70 carried by an adjusting screw 71 which is threaded into nuts indicated at 72 which are fixedly carried by a suitable bracket structure as indicated. By turning the screw 71, the flange 70 will be axially adjusted and thereby effect corresponding lateral or axial adjustment of the shaft 56 or 57 to correspondingly adjust the position of the paper roll 54 or 55.

The paper webs 73 and 74 respectively are drawn downwardly from the respective supply rolls 54 and 55 and around mutually independent tensioning rolls 75 and 76

Figure 6:
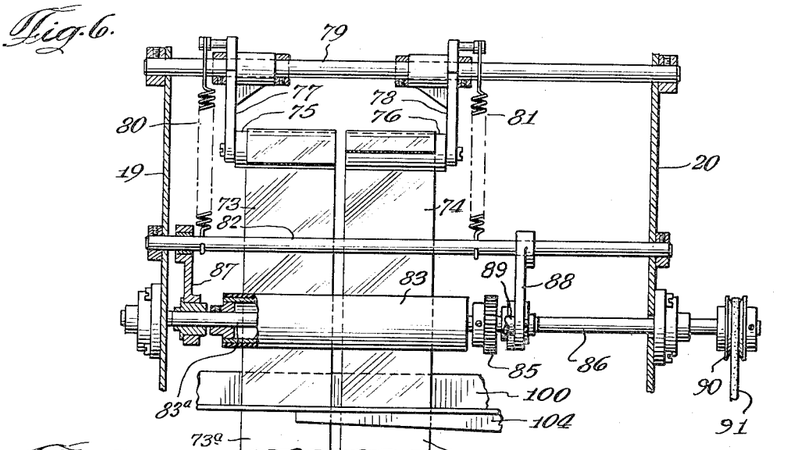
Fig. 6 is a fragmentary plan section on the line 6—6 of Figs. 1 and 2.

(Figs. 1 and 6). These rolls 75 and 76 are carried by suitable arms 77 and 78 respectively, which are rotatably mounted on a cross shaft 79 which is suitably mounted in the frame plates 19 and 20. Coil springs 80 and 81 stretched between portions of the arms 77 and 78 and a cross shaft 82, serve to yieldingly urge the tensioning rollers 75 and 76 to move in the proper direction for tensioning the paper webs. The cross shaft 82, like the shaft 79 is suitably supported in the frame plates 19 and 20.

From the tensioning rolls 75 and 76, the webs are carried horizontally between upper and lower feed rolls 83 and 84 respectively, the lower roll 84 being driven and the upper rolls 83 being connected by suitable gearing indicated at 85 (Figs. 2 and 6) to said lower roll for rotation therewith. The roll 84 is secured to a shaft 86 which is suitably journalled in said side frames of the machine and the upper roll 83 is carried by a shaft 83a which is journalled at its ends in the free ends of depending arms of a pair of bell cranks 87 and 88 which are rockably mounted on the aforesaid shaft 82. Said bell cranks 87 and 88 each have horizontally extending arms (see Fig. 1) which have their rear or free ends journalled on the aforesaid shaft 82 so that the weight of said bell crank arms and the roller 83 tend to maintain the roller 83 in cooperative relation to the driven roller 84. The bell crank arms 87 and 88 are interconnected by means of a cross bar 89 which has its ends suitably secured to the respective bell cranks so that said bell cranks together with said cross rod 89 and roller 83 may be elevated about the shaft 82 to space the roller 83 from the roller 84 to facilitate threading of the paper webs between said rollers.

Figures 8, 9, 10, 11:
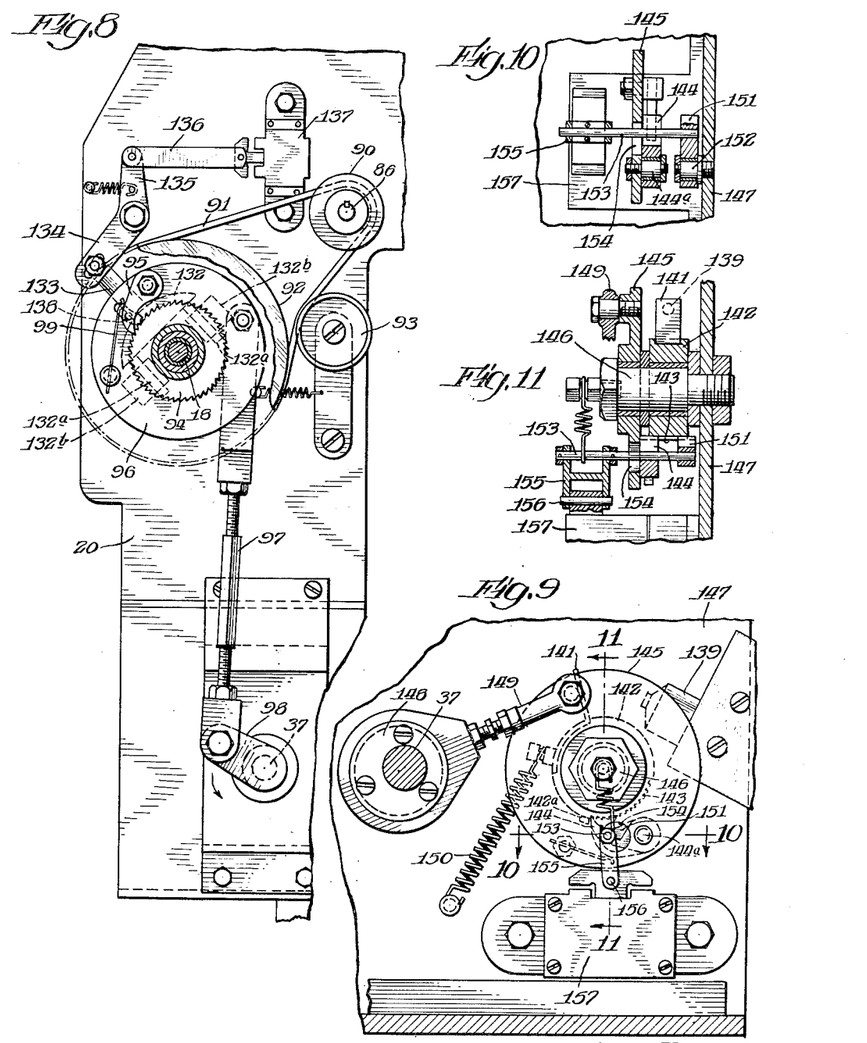
Fig. 8 is an elevational view on the line 8—8 of Fig. 2.
Fig. 9 is a cross-section on the line 9—9 of Fig. 2.
Figs. 10 and 11 are sectional views on the lines 10—10 and 11—11 respectively on Fig. 9.

The means for driving the lower roller 84 is shown mainly in Figs. 1, 2 and 8 of the drawings. As there shown, the shaft 86 of said roller 84 is equipped with a pulley 90, this pulley being suitably secured to the shaft. A belt 91 extends around said pulley and around a larger pulley 92 which is freely rotatably mounted on an extension of the fixed shaft 18. A spring biased takeup pulley 93 (Figs. 1 and 8) maintains the belt 91 taut. The pulley 92 is driven intermittently through successive arcs of predetermined lengths, in this instance, arcs of approximately 90°, to impart the required extent of rotation to the shaft 86 and the feed rollers 83 and 84 for feeding the desired lengths of the paper webs.

The said successive steps of rotation of the pulley 92 are effected by means of a ratchet wheel 94 which is rigidly connected through a hub to the pulley 92. A pawl 95 carried by a disc 96 engages said ratchet wheel to drive the same in one direction while travelling freely over the ratchet in the opposite direction. Said disc 96 is connected by an adjustable length link 97 to a crank arm 98 which is secured to an end extension of the continuously driven main shaft 37. The rotation of the crank 98 is converted by the link connection 97 to the disc 96 into oscillating movement of the disc 96 and the pawl 95 about the axis of the shaft 18, the length of the crank 98 and the point of connection of said link 97 to the disc 96 being selected to cause the pawl to travel and drive the ratchet 94 and pulley 92 through the desired arc of movement. A suitable leaf spring 99 is preferably provided as shown for yieldingly holding the pawl 95 normally in engagement with the ratchet 94.

Predetermined lengths of the paper webs 73 and 74 will be advanced by the feed rollers 83 and 84 across the stationary knife 100 or shearing mechanism and thence into suitable guideways or tracks 101 which receive the margins of said webs 73 and 74 to guide the same horizontally into overlying relation to the cheese slices in the position 53. These guides 101 are suitably supported by brackets 102 which are secured to and depend from a cross arm structure 103 which is secured to the sides 19 and 20 of the frame structure.

When the paper webs have been advanced to the extent required the forward end portions thereof are cut from the supply strips by means of the aforesaid stationary lower knife 100 and a pivoted upper knife 104 which cooperates with said lower knife 100. The knife 104 is pivoted at one end as indicated at 105 (Fig. 2) in a bracket 106 which is mounted on the adjacent side frame plate 20. Pivotal shearing movement of said knife blade 104 is effected by means of a connecting rod 107 which is pivoted at its upper end to said knife member 104 and at its lower end to a lever 108 (Fig. 1) which is pivotally mounted as indicated at 108a on a bracket secured to a part of the frame structure. The lever 108 is urged to rock downwardly by means of a coil spring 109 (Figs. 1 and 2) which is conected between the said lever and a suitable anchor pin carried by the frame structure. Said lever 108 carries a roller 110 which engages a cam 111 suitably formed to rock the lever 108 and the upper knife 104 at proper intervals for cutting the paper webs 73 and 74.

End portions of the paper webs 73 and 74 cut from the supply strips as just explained, constitute separator sheets 73a and 74a (Fig. 5) such sheets being supported in the guides 101. These separator sheets are pressed downwardly against the then upper faces of the cheese slices in the position 53. The mechanism for pressing the separator sheets downwardly into place against the cheese slices on the impaling pins 43 is best shown in Figs. 4 and 5. As there shown, suitable presser plates 112 are secured to the lower ends of rods 113 which are vertically slidably mounted in suitably bushed bearings 114 which are secured to and depend from the cross arm 103. The upper ends of said rods 113 are interconnected by a cross arm 115 which is rigidly secured to said rods, and coil springs 116 interposed between said cross arm 115 and the cross member 103 serve to yieldingly hold the presser members 112 in elevated position which is determined by collars 113a secured on the rods 113. The cross connector 115 is pivotally connected as shown at 117 to a rod 118 which is connected to a piston within a pneumatic cylinder 119 (Figs. 1 and 2) carried by a fixed bracket 120 which extends upwardly from the cross member 103. By the admission of compressed air to the upper end of the cylinder 119, said presser plates 112 will be moved downwardly to an extent sufficient to press the separator sheets 73 and 74 against the faces of the cheese slices and to effect impalement of said sheets on the pins 43, the latter and the cheese slices thereon being incidentally moved upwardly to meet said downwardly fed separator sheets.

The control of the delivery and relief of compressed air to and from the pneumatic cylinder 119 is a function of an air valve 121 (Figs. 1 and 2) which is controlled by a cam 112 carried by the main drive shaft 37. Said cam 122 acts against a roller 123 which is carried by one end of a rock arm 124 pivotally mounted intermediate its ends as shown at 125 in a bracket which is integral with the body of the valve 121. The other end of said arm 124 is connected to the valve plunger 126 whereby the flow or air through said valve is controlled in accordance with the formation of the cam 122. Said cam is, of course, properly formed to secure the desired flow of compressed air into the pneumatic cylinder 119 and the desired relief of compressed air therefrom. Said valve 121 is connected by suitable pipe 127 (Fig. 2) to a source of compressed air and by suitable piping 128 to the pneumatic cylinder 119.

To facilitate the impalement of the separator sheets on the carrying pins 43 as above explained, said carrying pins together with the cheese slices carried thereby are adjusted from their normal position relative to the turret end plate 21 as determined by the cams 45, to a position above that shown in the position 53 of Fig. 4, so that the paper separator sheets need be moved downwardly a correspondingly reduced distance.

Elevation of the pins 43 and the cheese slices carried by said pins in station 53 is effected by means of a pusher 129 which is rigidly secured to extension of the cross connector 115 (Fig. 5). When the presser plates 112 are lowered, said pusher 129 engages the aligned end portion 51 of the rock arm 48 to cause the same to rock so as to force the pin carrying plate 42 upwardly. Hence, the pins 43 with the cheese slices thereon are temporarily elevated to receive the separator sheets 73a and 74a and when said presser plates 112 are retracted, the pins 43 with the cheese slices and the separator sheets thereon are lowered to the position represented in Fig. 5, the springs 44 serving to effect such retraction of the pin plate.

The pin plate 42 and its pins 43 together with the cheese slices and separator sheets carried by said pins will next be delivered into a vertical position or station indicated at 130 (Figs. 1, 3 and 4) which may be designated as an inactive station, there being no operations performed in this position.

A succeeding step of rotation imparted to the turret, delivers the cheese slices and separator sheets to a downwardly facing position 131 immediately over a conveyor B as indicated in Figs. 4 and 5. The pin plate 42 and its pins 43 are there retracted to strip the cheese slices and separator sheets from said pins 43. This stripping action is effected by providing the cams 45 with recessed seats 45a (Fig. 4) which permit the control rods 41 to move inwardly of the turret a distance sufficient to completely retract the pins 43 with reference to the turret plates 21. The springs 44 are, of course, operative to effect such retraction and the cheese slices and separator papers are thereupon deposited on the conveyor belt B as shown in Figs. 4 and 5.

It will be understood that in each quarter revolution of the turret structure, the described operations occur substantially simultaneously at the successive stations so that when cheese slices are being initially delivered to the pins 43 at one station, separator sheets are being delivered in another station, and cheese slices and separator sheets are being discharged in still another station.

By intermittently actuating the conveyor B at appropriate intervals, as many cheese slices as desired (with interleaved separator sheets) may be collected in stacks for subsequent packaging.

It is preferred that the first cheese slices deposited on the conveyor to start a new stack of slices be deposited without any paper separator sheets so that when the stack is removed from the conveyor, the bottom cheese slice will form one of the visible faces of the stack. Accordingly, means is provided for intermittently effecting omission of the paper separator sheets, this means being such that paper sheets are omitted at intervals corresponding to the number of cheese slices which are to be collected in the stack. For example, if it is desired to collect eight cheese slices in a stack to be wrapped for distribution, the first slice should be delivered to said turret and by it delivered to the receiving conveyor B without a separator sheet so that the bottom of the stack on the conveyor would be provided by a face of the cheese slice delivered thereto. The next seven slices delivered to the turret would have the paper separator sheets applied thereto in the manner explained and these would be successively delivered on top of the slice first delivered to the conveyor. Accordingly, the stacks would have cheese slices on their outer faces. The next or ninth cheese slice would then represent the beginning of a new stack and should accordingly be delivered to the conveyor without an associated separator sheet, the conveyor being suitably advanced to present clear receiving area to the discharge side of the turret.

To effect periodic interruption of the delivery of separator sheets to cheese slices, there is provided mechanism which will periodically hold the pawl 95 (Fig. 8) in elevated relation to the ratchet 94 during one of its feed movement strokes. For lifting the pawl 95 out of engagement with the rachet, there is provided a cam segment 132 which has guide pins 132a rigid therewith slidably supported in suitably drilled bosses 132b on the adjacent frame plate 20. Said cam segment is connected by an arm 133 to one arm 134 of a bell crank. The other arm 135 of said bell crank is connected by a link 136 to the plunger of a solenoid 137. When the solenoid is energized, the bell crank will be rocked in the proper direction (clockwise in Fig. 8) to move the segment 132 outwardly relative to the periphery of the ratchet 94 whereupon said segment will engage a pin 138 which projects from said pawl 95 so as to lift the latter against the pressure of the spring 99 from operative engagement with the ratchet. The pin 138 extends through a suitable slot in the disc 96 into overlying relation to said segment 132.

Energization of the solenoid 137 is controlled by a pair of switches 139 and 140 (Figs. 2 and 9). The switch 139 may be considered the initiating switch. It is normally open but is closed periodically by a finger 141 which is carried by the member 142 which has a series of ratchet teeth 143 on a portion of its periphery. This member 142 is rotated tooth by tooth by means of a pawl 144 which is pivoted on a disc 145 as indicated at 144a (Fig. 10). Said disc 145 is rotatably mounted in a stub shaft 146 secured to a frame member 147. The disc 145 is oscillated through an arc of sufficient length to move the pawl 144 the distance of one of the ratchet teeth 143 so that for each oscillation of the disc, said member 142 is advanced the length of one tooth. Such oscillation is imparted to the disc 145 by means of an eccentric 148 carried by the main drive shaft 37 and operating through an eccentric ring and pitman 149 which is pivoted at its free end to the disc 145.

Step by step movement of the member 142 is resisted by a suitable tension spring 150. To hold the member 142 against retractive movement with the pawl 144, a second pawl 151 engages another portion of the ratchet teeth 143. This second pawl 151 is mounted concentrically with the pawl 144 on a pin 152, which is fastened in said frame member 147. A pin 153 is secured in said pawl 151 and extends over the pawl 144 and through a hole 154 in the disc 145 and has its other end mounted in the upper end of a link structure 155, the lower end of which is pivoted as shown at 156 to the plunger of a solenoid 157. The solenoid 157 is energized periodically to effect withdrawal of the pawls 144 and 151 from engagement with the teeth 143 so that the spring 150 may restore the ratchet member 142 to starting position in which it is illustrated in Fig. 9. The starting position is determined by a lug 142a on the ratchet, said lug being operative to engage the free end of said pawl 144.

When the ratchet member 142 has been moved through the number of steps corresponding to the number of cheese slices to be incorporated in a package the switch 139 will be closed. This switch 139 is connected to the switch 140 in such a way as to cause the latter to also be closed to establish an electric circuit to the solenoids 157 and 137. The switch 140 may control a latching type relay or in any other suitable manner establish a closed circuit to the said solenoids 157 and 137 so as to maintain the same energized for a sufficient period of time to permit restoration of the ratchet member 142 to starting position and to permit one complete inoperative feed movement to be imparted to the paper feeding pawl 95. The switch 139 is only momentarily held closed while the finger 141 is in engagement with the switch, that engagement being of but momentary duration because return of the finger to its starting position commences almost immediately upon closing of said switch 139 and energization of the solenoid 157. Hence, the switch 140 is employed to maintain for an extended but nevertheless limited duration, circuits to the said solenoids. The switch 140 is in due time opened by a cam 158 which is carried by said main shaft 37. When the switch 140 is thus opened, the electrical connections are restored to starting position so as to be ready for the next operation. By thus periodically interrupting the feed of the paper, cheese slices will periodically be delivered to the conveyor B without a separator sheet.

The various switch actuating operations are, of course, performed during one complete revolution of the shaft 37. In one practical embodiment, the cam 158 is so formed as to maintain the switch 140 closed during about 185° rotation of the cam and said shaft 37, which rotation provides a sufficient time interval for the performance of the described operations. The ratchet member 143 may, of course, be replaced by others having different numbers of teeth or provision may be made for providing the maximum number of teeth required in any instance and the switch actuating finger 141 may be adjustably mounted on the periphery of said member 142 so that it will travel from its starting position to its switch closing position upon any given number of steps of movement of the ratchet member 142.

Figure 7:
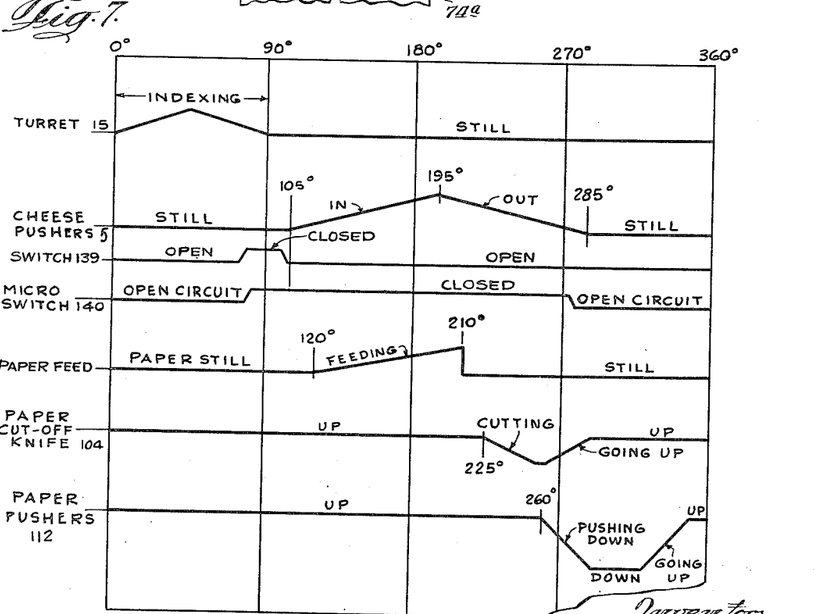
Fig. 7 is a timing diagram.

The timing diagram (Fig. 7) illustrates in a graphic manner the relative timing of the operating parts of the apparatus.

Various changes in the described mechanism may be made while retaining the principles thereof to which the appended claims are directed.

In the following claims, the words "cheese slice" and words of similar import, are used only for exemplary identification of sheets or slices of any material with which separator sheets are interleaved and the said words should accordingly be interpreted broadly enough to include slices or sheets of other material which may be handled by the described method and apparatus.

We claim:

1. The method of forming a stack of interleaved slices of cheese and separator sheets, which method comprises the steps of transporting a succession of cheese slices through an arcuate path of travel about a horizontal axis, delivering mutually independent separator sheets respectively to the cheese slices in a predetermined portion of said path of travel, thereby forming a succession of assemblies respectively comprising a cheese slice and a separator sheet, and, in a succeeding portion of said path of travel, successively delivering a plurality of said assemblies into a stack.

2. The method of preparing a stack of interleaved cheese slices and separator sheets, which method comprises the steps of transporting a succession of cheese slices through a circular path of travel about a horizontal axis, assembling mutually independent separator sheets successively with the cheese slices on an upper portion of said path of travel, and after the assembled slices and sheets reach a position in a lower portion of said path of travel, successively delivering a plurality of the assembled cheese slices and separator sheets as units downwardly into a stack.

3. Apparatus for interleaving cheese slices and separator sheets, comprising conveying means having a plurality of spaced, cheese slice holders, means for moving said conveying means so as to present each of said holders successively in a plurality of predetermined positions, means for delivering a cheese slice to each holder when presented in one of said positions, means for delivering a separator sheet to each holder in a succeeding position thereof whereby a separator sheet is associated with a cheese slice, means for stripping said associated cheese slices and separator sheets from the respective holders in still another position thereof, and means for receiving said slices and separator sheets from said holders to form a stack of interleaved slices and separators.

4. Apparatus for interleaving cheese slices and separator sheets, comprising a rotatable turret having a plurality of circumferentially spaced radially outwardly facing cheese slice holders, means for rotating said turret step by step so as to present each of said holders successively at rest in a plurality of predetermined positions, means for delivering a cheese slice to each holder when presented in one of said positions, means for delivering a separator sheet to each holder in a succeeding position thereof, whereby a separator sheet is associated with a cheese slice, means for stripping said cheese slices and separator sheets from the respective holders in still another position thereof, and means for receiving said slices and separators from said holders to form a stack of interleaved slices and separators.

5. Apparatus for interleaving cheese slices and separator sheets, comprising a rotatable turret having a plurality of circumferentially spaced radially outwardly facing cheese slice holders, means for rotating said turret so as to present each of said holders successively in a plurality of predetermined positions, means for delivering a cheese slice to each holder when presented in one of said positions, means for delivering a separator sheet to each holder in a succeeding position thereof whereby a separator sheet is associated with a cheese slice, means for stripping said associated cheese slices and separator sheets from the respective holders in still another position thereof, means for receiving said slices and separators from said holders to form a stack of interleaved slices and separators, and means for periodically interrupting the delivery of said separator sheets to thereby cause a cheese slice to be delivered without a separator sheet to said receiving means.

6. Apparatus for interleaving cheese slices and separator sheets, comprising a rotatable turret having a plurality of circumferentially spaced radially outwardly facing cheese slice holders, means for rotating said turret so as to present each of said holders successively in a plurality of predetermined positions, means for delivering a cheese slice to each holder when presented in one of said positions, means for supporting a supply strip of separator sheet material, means for automatically feeding said material endwise to position an end portion of such strip in proximity to a second holder position, the means for severing such end portion from said supply strip to form a separator sheet, means for delivering such separator sheet facewise to a holder in said second position to thereby associate such separator sheet with a cheese slice carried by such holder, means for stripping said cheese slices and separator sheets from the respective holders in a third position thereof, and means for receiving said slices and separators from said holders to form a stack of interleaved slices and separators.

7. Apparatus wherein a rotated turret having a plurality of circumferentially spaced holders is employed for transporting cheese slices through a predetermined path of travel, each of said holders comprising a pin plate radially reciprocably mounted in said turret and provided with a plurality of impaling pins projecting outwardly of the turret, said turret embodying a stripper plate outwardly of each of said pin plates, each such stripper plate being provided with holes through which said impaling pins are adapted to be projected from said turret to thereby be made accessible for impaling, holding and transporting the cheese slices, and means for effecting reciprocation of said pin plates to effect successive, outward projection of said impaling pins for receiving cheese slices and retraction of said pins so as to cause said stripper plates to strip cheese slices from said pins.

8. Apparatus wherein a rotated turret having a plurality of circumferentially spaced holders is employed for transporting cheese slices through a predetermined path of travel, each of said holders comprising a pin plate radially reciprocably mounted in said turret and provided with a plurality of impaling pins projecting outwardly of the turret, said turret embodying a stripper plate outwardly of each of said pin plates, each such stripper plate being provided with holes through which said impaling pins are adapted to be projected from said turret to thereby be made accessible for impaling, holding and transporting the cheese slices, and means for effecting reciprocation of said pin plates as an incident to rotation of the turret to effect successive, outward projection of said impaling pins for receiving cheese slices and retraction of said pins so as to cause said stripper plates to strip cheese slices from said pins.

9. Apparatus for interleaving cheese slices and separator sheets wherein there is a rotated turret having a plurality of circumferentially spaced holders which are successively moved into successive positions along a predetermined path of travel, means for delivering cheese slices and separator sheets to said holders in successive positions thereof, and means for stripping such cheese slices and separator sheets from said holders in another position thereof, each of said holders comprising a pin plate radially reciprocably mounted in said turret and provided with a plurality of impaling pins projecting outwardly of the turret, a stripper plate outwardly of each of said pin plates, each such stripper plate being provided with holes through which said impaling pins are adapted to be projected from said turret to thereby be made accessible for impaling, holding and transporting the cheese slices, means for effecting normal reciprocation of the pin plates as an incident to rotation of the turret to effect successive, outward projection of said impaling pins for receiving cheese slices and separator sheets and retraction of said pins so as to cause said stripper plates to strip cheese slices and separator sheets from said impaling pins, and means for effecting extended projection of said impaling pins when in cheese slice receiving position.

10. Apparatus for interleaving cheese slices and separator sheets wherein there is a rotated turret having a plurality of circumferentially spaced holders which are successively moved into successive positions along a predetermined path of travel, means for delivering cheese slices and separator sheets to said holders in successive positions thereof, and means for stripping such cheese slices and separator sheets from said holders in another position thereof, each of said holders comprising a pin plate radially reciprocably mounted in said turret and provided with a plurality of impaling pins projecting outwardly of the turret, a stripper plate outwardly of each of said pin plates, each such stripper plate being provided with holes through which said impaling pins are adapted to be projected from said turret to thereby be made accessible for impaling, holding and transporting the cheese slices, means for effecting normal reciprocation of the pin plates as an incident to rotation of the turret to effect successive, outward projection of said impaling pins for receiving cheese slices and separator sheets and retraction of said pins so as to cause said stripper plates to strip cheese slices and separator sheets from said impaling pins, and means operative as an incident to the operation of said cheese slice delivery means to effect extended projection of said impaling pins in said cheese slice receiving position.

11. Apparatus for interleaving cheese slices and separator sheets wherein there is a rotated turret having a plurality of circumferentially spaced holders which are successively moved into successive positions along a predetermined path of travel, means for delivering cheese slices and separator sheets to said holders in successive positions thereof, and means for stripping such cheese slices and separator sheets from said holders in another position thereof, each of said holders comprising a pin plate radially reciprocably mounted in said turret and provided with a plurality of impaling pins projecting outwardly of the turret, a stripper plate outwardly of each of said pin plates, each such stripper plate being provided with holes through which said impaling pins are adapted to be projected from said turret to thereby be made accessible for impaling, holding and transporting the cheese slices, means for effecting normal reciprocation of the pin plates as an incident to rotation of the turret to effect successive, outward projection of said impaling pins for receiving cheese slices and separator sheets and retraction of said pins so as to cause said stripper plates to strip cheese slices and separator sheets from said impaling pins, and means for effecting extended projection of said impaling pins in the separator receiving sheet positions thereof.

12. Apparatus for interleaving cheese slices and separator sheets, comprising a rotatable turret having a plurality of circumferentially spaced radially outwardly facing cheese slice holders, means for rotating said turret so as to present each of said holders successively in a plurality of predetermined positions, means for delivering a cheese slice to each holder when presented in one of said positions, means for supporting a supply strip of separator sheet material, means for automatically feeding said material endwise to position an end portion of such strip in proximity to a second holder position, means for severing such end portion from said supply strip to form a separator sheet, means for delivering such separator sheet facewise to a holder in said second position to thereby associate such separator sheet with a cheese slice carried by such holder, means for stripping said associated cheese slices and separator sheets from the respective holders in a third position thereof, means for receiving said slices and separators from said holders to form a stack of interleaved slices and separators, and means for periodically interrupting the feed of said separator sheet material so as to prevent delivery of a separator sheet to a holder in said second position.

13. Apparatus for interleaving cheese slices and separator sheets, comprising a rotatable turret having a plurality of circumferentially spaced radially outwardly facing cheese slice holders, means for rotating said turret so as to present each of said holders successively in a plurality of predetermined positions, means for delivering a cheese slice to each holder when presented in one of said positions, means for supporting a supply strip of separator sheet material, electro-magnetically controlled means for automatically feeding said material endwise to position and end portion of such strip in proximity to a second holder position, means for severing such end portion from said supply strip to form a separator sheet, means for delivering such separator sheet facewise to a holder in said second position to thereby associate such separator sheet with a cheese slice carried by such holder, means for stripping said cheese slices and separator sheets from the respective holders in a third position thereof, means for receiving said slices and separators from said holders to form a stack of interleaved slices and separators, and means for periodically interrupting the feed of said separator sheet material so as to prevent the delivery of a separator sheet to a holder in said second position, said interrupting means comprising an electric switch in the circuit of said strip feed controlling means, and means correlated with the feed of cheese slices to said turret and operative at selected intervals to actuate said switch to so affect the electric circuit of said feed controlling means as to actuate said electro-magnetically controlled means to prevent the feed of said separator material supply strip.

14. Apparatus for interleaving cheese slices and separator sheets, comprising a rotatable turret having a plurality of circumferentially spaced radially outwardly facing sets of cheese slice and a separator sheet impaling pins, means for rotating said turret so as to present each of said holders successively in a plurality of predetermined positions, means for delivering a cheese slice to each set of pins when present in one of said positions, means for supporting a supply strip of separator sheet material, means for automatically feeding and guiding said material endwise to position an end portion of such strip in proximity to a second holder position, means for severing such end portion from said supply to form a separator sheet, reciprocable plunger means for delivering such separator sheet facewise to a holder in said second position to thereby associate such separator sheet with a cheese slice carried by such holder, said plunger means comprising a plate having a plurality of holes therein for clearing said pins when effecting impalement of said separator sheet on said holder pins, means for stripping said cheese slices and separator sheets from the respective sets of pin in a third position thereof, and means for receiving said slices and separators from said holders to form a stack of interleaved slices and separators.

References Cited in the file of this patent

UNITED STATES PATENTS

| | | |
|---|---|---|
| 1,592,426 | Hilder | July 13, 1926 |
| 2,635,965 | Hensgen et al. | Apr. 21, 1953 |
| 2,667,420 | Meulemans et al. | Jan. 26, 1954 |
| 2,683,557 | Jenney | July 13, 1954 |